United States Patent

Rosan, Sr.

[15] 3,654,852

[45] Apr. 11, 1972

[54] APPARATUS AND METHOD FOR EXTRACTING THE ESSENCE FROM A FOOD SUBSTANCE BY CONTROLLED AGITATION

[72] Inventor: Jose Rosan, Sr., Rancho San Juan, San Juan Capistrano, Calif. 92675

[22] Filed: Apr. 22, 1970

[21] Appl. No.: 30,771

Related U.S. Application Data

[63] Continuation-in-part of Ser. No. 675,736, Aug. 23, 1967, abandoned.

[52] U.S. Cl. ................................................................99/323
[51] Int. Cl. ..............................................................A47j 17/62
[58] Field of Search ..................99/279, 287, 323, 295, 298, 99/316, 317, 321, 322, 75, 77.1

[56] References Cited

UNITED STATES PATENTS

| | | | |
|---|---|---|---|
| 1,984,047 | 12/1934 | Thieme | 99/323 |
| 2,858,762 | 11/1958 | Wade | 99/348 |
| 2,072,976 | 3/1937 | Andrus | 99/323 |
| 2,133,166 | 10/1938 | Fritsche | 99/323 |

FOREIGN PATENTS OR APPLICATIONS

| | | | |
|---|---|---|---|
| 854,867 | 5/1959 | Great Britain | 99/323 |

Primary Examiner—Robert W. Jenkins
Attorney—Roman A. Di Meo

[57] ABSTRACT

This invention relates to an apparatus and method for extracting the essence from a food substance such as coffee by placing the food substance in a porous basket, bag or other porous container and agitating the same in an ambient liquid.

9 Claims, 16 Drawing Figures

PATENTED APR 11 1972 3,654,852

INVENTOR
JOSÉ ROSÁN, SR.
BY
Roman G. Di'Leo
ATTORNEY

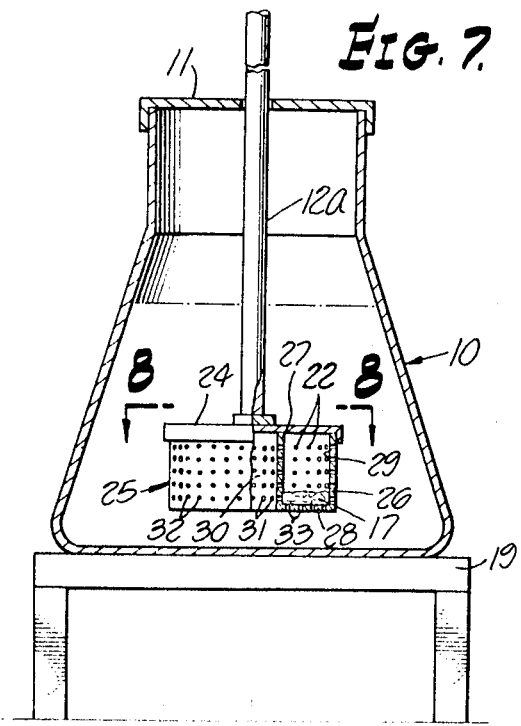
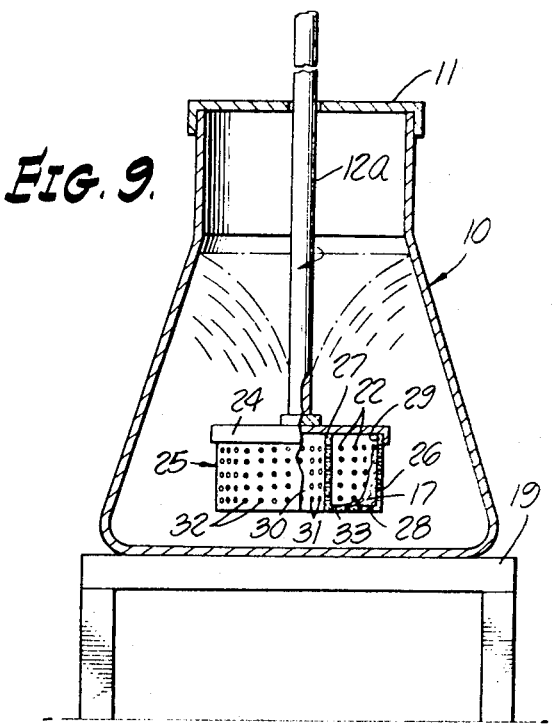
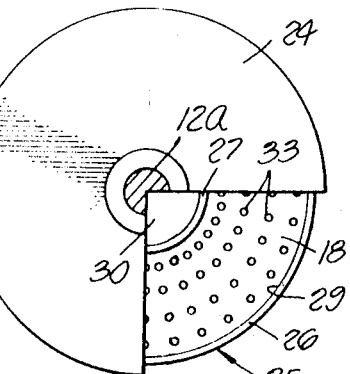
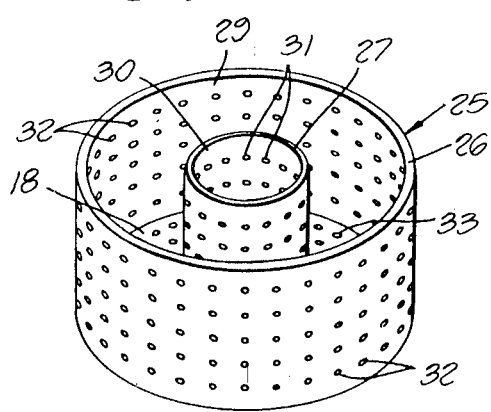
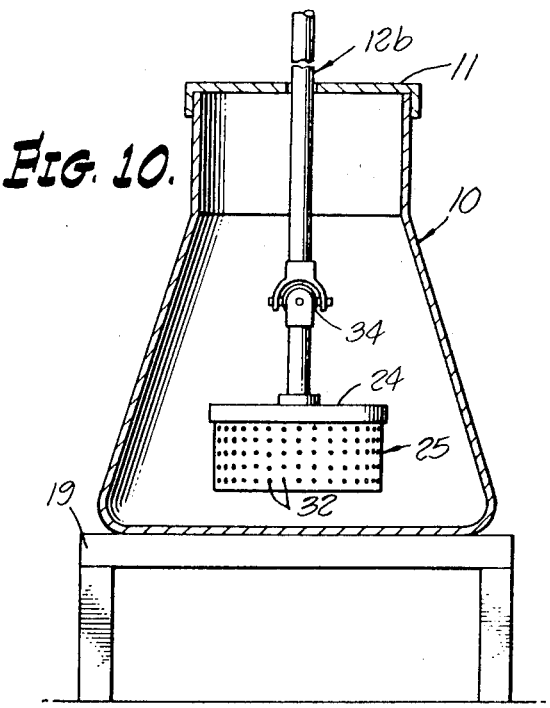
INVENTOR
JOSÉ ROSÁN, SR.

INVENTOR
JOSÉ ROSÁN, SR.
BY
ATTORNEY

APPARATUS AND METHOD FOR EXTRACTING THE ESSENCE FROM A FOOD SUBSTANCE BY CONTROLLED AGITATION

This application is a continuation-in-part of my copending application Ser. No. 675,736, filed Sept. 25, 1967, now abandoned.

The invention described herein relates to an apparatus and method for extracting the essence from a food substance and more specifically to an apparatus and method for extracting an essence by use of controlled agitation of the food substance.

Heretofore the more common means for extracting the essence from food substances, i.e., coffee or the like, consisted of inanimately or statically exposing the substance from which the extraction is to be made to an ambient liquid media such as water. Although the apparatus and method for extracting a food substance essence described in the instant invention may be used to derive a variety of liquors, for the purposes of facilitating the disclosure herein, the brewing of coffee liquor will be specifically discussed as an exemplar.

The instant invention is comprised of a receptacle for holding the ambient liquid (water) provided with a porous inner body or bodies attached to a rotating shaft at a predetermined height within the receptacle.

The porous inner body may be attached directly to the rotating shaft or indirectly by attachment to rigid, outwardly extending supports therefrom or nonrigid attachment means, i.e., flexible line, engaged to hooks carried by the rotating shaft.

In the preferred embodiment, baskets are laterally suspended from the rotating shaft by outwardly extending rigid support members, the basket which is secured to the extremity of the rigid support may be of any configuration provided it is completely enclosed and provides a means for placing coffee or the like therein. The number of support arms and their relative axial positions may be varied consistent with particular design desires, without deviating from the scope of the invention herein, provided the surface of the ambient liquid does not extend below the top of the baskets.

An alternate embodiment is comprised of porous bag means which are gathered at their opening to close the same. The means for gathering and closing the bag end is then attached to a rigid or nonrigid means for securement to a hook or other attachment means carried by the rotating shaft.

In still another embodiment, where the perforated basket is attached directly to the rotating shaft, the basket is preferably configured so as to have an outer wall connected by a bottom wall to a concentric inner wall surrounding an axial cavity or hollow space so as to roughly define a pair of concentric cylinders joined at one end by a common bottom.

Although the preferred configuration of the embodiment wherein the perforated basket is connected directly to the rotating shaft is comprised of an outer wall interconnected to a concentric inner wall by a bottom wall so as to roughly define a pair of concentric cylinders joined at one end by a common bottom, this basket may be formed with a continuous bottom wall and devoid of a concentric inner wall without deviating from the principles of the invention herein.

In either of the embodiments, ground coffee or the like which is placed in the bag or basket, will, upon rapid rotation of the shaft and concomitantly the basket or bag, be dispersed primarily along the inner surface of the outer wall of the bag or basket. Since the walls of the bag and basket are provided with a plurality of openings, as the bag or basket is rapidly rotated the whirlpool condition generated in the ambient liquid causes a current of the ambient liquid to flow through the wall openings.

It should be obvious at this point that the ground coffee which is dispersed about the inner surface of the outer wall results in a greater exposure of said coffee to the ambient liquid passing therethrough, thereby resulting in a more efficient extraction of the coffee essence into the ambient liquid. Of course, to increase the rate of essence extraction from the coffee, the ambient liquid, i.e., water, may be heated by any conventional means.

Regardless of the porous inner body structure, it should be understood that the inner body may be positioned at any elevation within the receptacle without deviating from the scope of the invention herein. The bag or basket may be rotated in any plane, or simultaneously rotated at random angles relative to the primary axis of rotation by the use of a universal joint or the like without deviating from the scope of the invention. Still further, while the bag or basket is being rotated in its primary rotational axis, the bag or basket may be oscillated along said axis thereby increasing the rate of extraction of the coffee essence.

It is therefore the object of this invention to provide an apparatus for increasing the efficiency of the essence extraction from a food substance by use of centrifugal force.

Another object is to provide an apparatus for increased efficiency of the essence extraction from a food substance by use of oscillation means in conjunction with said centrifugal force.

Still another object is to provide an apparatus for increased efficiency of the essence extraction from a food substance by use of means for random rotation in conjunction with predetermined rotation about a primary axis of rotation.

Another object is to provide a method for increasing the efficiency of essence extraction from a food substance by use of centrifugal force.

Still another object is to provide a method for increasing the efficiency of essence extraction from a food substance by the use of oscillation means in conjunction with centrifugal force.

Another object is to provide a method for increasing the efficiency of essence extraction from a food substance by the use of means for random rotation in conjunction with predetermined rotation about a primary axis of rotation.

Other objects and advantages will be readily apparent from the following description taken in conjunction with the accompanying drawings in which:

FIG. 7 is an elevational, sectional view of a receptacle provided with a rotatable basket and means for rotating the same inserted therein from the top thereof;

FIG. 8 is a top plan view, partly sectioned, of the basket having wall openings comprised of perforations, taken along the line 8—8 of FIG. 7;

FIG. 9 is an elevational view, in section, of the embodiment illustrated in FIG. 7 except that the basket thereof is shown in the process of being rotated, thereby creating a vortex in the ambient liquid and dispersing the food compound about the inner surface of the outer wall of the basket.

FIG. 10 illustrates another embodiment of the invention wherein the rotating means for the basket is comprised of two sections interconnected by a universal joint or the like.

FIG. 11 is a perspective view of the basket of FIGS. 7, 8, 9 and 10 without the cap positioned thereon.

FIG. 16 illustrates a perspective view of another embodiment of the basket wherein the walls of the basket are comprised of a mesh or the like.

Figure 1:
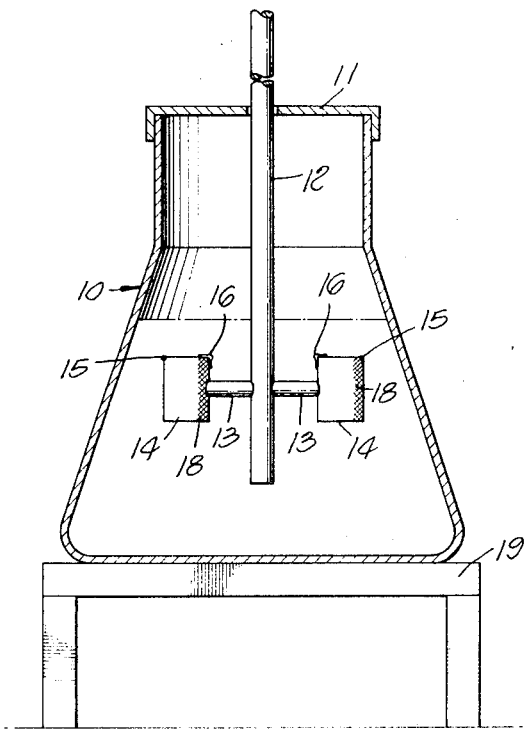
FIG. 1 is an elevational, sectional view of a receptacle provided with a plurality of perforated or porous baskets suspended from rigid support arms extending from a rotatable shaft.
Figure 2:
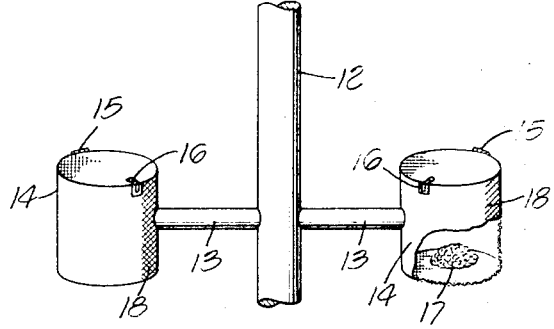
FIG. 2 is a perspective, sectioned view of the baskets illustrated in FIG. 1.

Referring more particularly to FIGS. 1 and 2, reference numeral 10 designates generally a liquid holding receptacle, i.e., a coffee pot. Enclosing said receptacle 10 is a cap 11 through which passes rotating shaft 12. Rigidly secured to shaft 12 are outwardly extending support members 13. Attached to the extremities of support members 13 are perforated or porous baskets 14. Access to the interior of baskets 14 may be obtained by hinging the tops thereof by conventional means 15 or the like, or constructing the basket walls so that a portion thereof may be hinged (not shown) to provide a trap door, etc. The entry means may be secured in a closed position by any conventional means such as snap lock means 16.

By rapidly rotating shaft 12 and concomitantly baskets 14 secured thereby by means of support members 13, the food substance (coffee) or the like 17 is displaced and maintained against the inner surface of the outer walls of the baskets. Because of the current caused by the whirlpool created in the ambient liquid due to the rapid rotation of the baskets, the ambient liquid flows into the baskets through the wall openings 18 contained in forward or lead walls and through the wall openings 18 in the rear or trailing walls. The ambient liquid is then passed through the coffee by centrifugal force so as to exit through the wall openings 18 in the trailing walls, as aforesaid. It should be obvious from the foregoing that disposing and maintaining the coffee along the inner surface of outer walls during the brewing cycle spreads the coffee and permits a greater quantity of ambient liquid to come into contact therewith, and pass therethrough into the major body of the ambient liquid, carrying with it the essence extracted from said coffee.

The baskets 14 may be of any number and be positioned at any elevation within the receptacle 10 provided that the surface of the ambient liquid does not extend below the top of the baskets.

To increase the rate of extraction and thus reduce the amount of time required for a brewing cycle, the ambient liquid may be heated by any extraneous heating source such as heating element 19 shown in FIG. 1.

The rate of essence extraction of coffee may also be increased, and accordingly the time required for the brewing cycle decreased, by oscillating rotating shaft 12 and concomitantly baskets 14 along the axis of said shaft.

After the brewing cycle, baskets 14 are removed from within receptacle 10 by removing cap 11 and lifting rotating shaft 12 from the receptacle.

Figure 3:
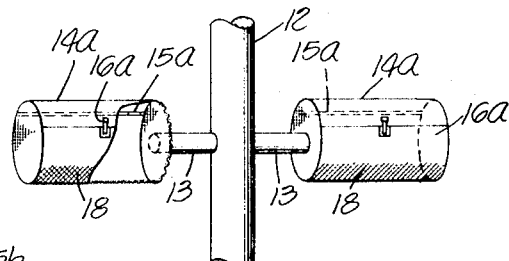
FIG. 3 is an elevational, sectioned view of another embodiment of the baskets illustrated in FIG. 1.

FIG. 3 illustrates an alternate embodiment of the baskets of FIG. 1, wherein the major axis of baskets 14a are in a plane normal to the axis of rotating shaft 12, and a portion of the wall is hinged as at 15a as well as being provided with a snap lock means 16a.

Figure 4:
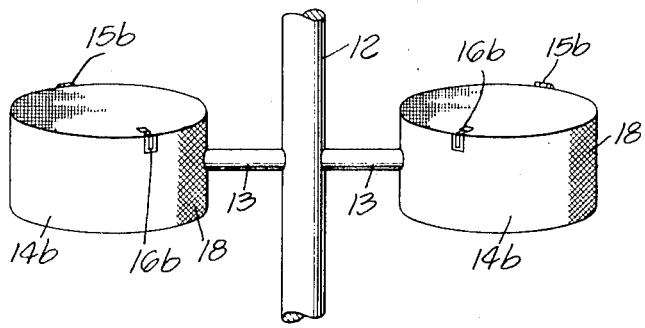
FIG. 4 is an elevational, sectional view of still another embodiment of the baskets shown in FIG. 1.

FIG. 4 also illustrates an alternate embodiment of baskets 14 of FIG. 1, wherein the major axis of baskets 14b are coextensive with the width thereof and are provided with hinge means 15b and snap lock means 16b.

Figure 5:
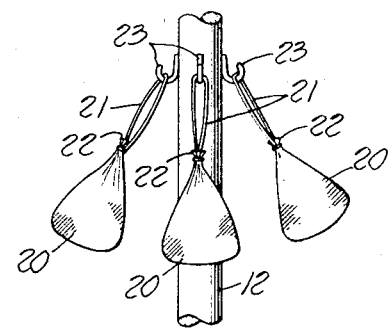
FIG. 5 is an elevational, sectional view of the perforated or porous bag means suspended directly to the rotating shaft means of FIG. 1.
Figure 6:
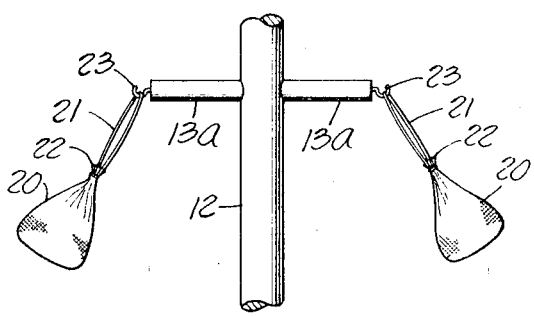
FIG. 6 is an elevational, sectional view of the perforated or porous bag means suspended from rigid support arms extending from the rotatable shaft of FIG. 1.

In FIGS. 5 and 6, perforated or porous bag means 20 are suspended by nonrigid cinching means 21, i.e., string for gathering and thereby closing the open end 22 of said bag means. The bag means may then be engaged by any conventional means such as hook means 23, either directly to rotating shaft 12 or to support members 13a outwardly extending from the shaft 12.

It should be noted that the bag means may be cinched by rigid or semirigid means to shaft 12 or support members 13a and may be suspended at any elevation within the receptacle 10 without deviating from the scope of the invention herein.

It should be further noted that the bag means may also be prepacked with coffee or tea and completely sealed prior to its use. In any event, the bag means are removed by removing the cap 11 and lifting rotatable shaft 12 from the receptacle 10. The bag means 20 are then discarded.

In FIGS. 7-9 and 11 shaft 12a is secured to basket cap 24, which is adapted to be in removable engagement with basket 25, such as snapping on to the basket. Basket 25 is comprised of an outer cylindrical wall 26 and a concentrically positioned inner cylindrical wall 27. Bottom wall 28 of basket 25 engages the concentrically positioned cylindrical walls 26 and 27 so as to provide a pair of concentric hollow cylinders joined at one end and having the opposite end thereof open. The open end of said basket 25 is adapted as aforesaid to be in removable engagement with basket cap 24. For the purpose of illustration, in FIGS. 7 and 9 shaft 12a, cap 24 and basket 25 are shown partly sectioned. In addition, again a food substance 17, such as ground coffee or the like, is deposited on bottom wall 28.

By rapidly rotating shaft 12a and concomitantly basket 25 secured thereby by means of basket cap 24, the food substance (coffee) 17 is displaced and maintained against the inner surface 29 of outer wall 26 of the basket. Because of the current caused by the whirlpool created in the ambient liquid due to the rapid rotation of the basket, the ambient liquid flows into basket hollow 30, through the wall openings 31 contained in inner wall 27 and through the wall openings 33 in bottom wall 28. The ambient liquid is then passed through the coffee 17 by centrifugal force so as to exit through the wall openings 32 positioned in outer wall 26. As was the case with the embodiments of FIGS. 1-6, disposing and maintaining the coffee along the inner surface of outer wall 26 during the brewing cycle spreads the same and permits a greater quantity of ambient liquid to come into contact with, and pass through, the coffee and into the major body of the ambient liquid, carrying with it the essence extracted from said coffee.

As hereinabove indicated, the basket 25 may be positioned at any elevation within the receptacle 10 provided that the surface of the whirlpool vortex in the ambient liquid resulting from the rapid rotation of said basket does not extend below cap 24.

As hereinabove indicated, without deviating from the scope of the invention herein, basket 25 may also be constructed so that bottom wall 28 comprises a continuous porous surface, inner wall 27 is eliminated and basket 25 thereby defines a cup-like structure. Thus, upon rotation of basket 25 the ambient liquid flows through the openings 33 in the continuous bottom wall 28, passes through the coffee 17 and exits through openings 32 of outer wall 26.

Again, the rate of essence extraction of coffee may be increased, and accordingly the time required for the brewing cycle decreased, by oscillating rotating shaft 12a and concomitantly basket 25 along the axis of said shaft.

After the brewing cycle, basket 25 is removed from within the receptacle 10 by lifting rotating shaft 12a which is secured to basket cap 24 and concomitantly basket 25.

FIG. 10 illustrates an alternate embodiment from that of FIGS. 7 and 8 wherein rotating shaft 12b is comprised of two sections interconnected by a conventional universal joint 34. In all respects the elements shown in FIG. 10 are similar to those illustrated in FIGS. 7-9. In this embodiment, in addition to the basket 25 being rapidly rotated in a plane normal to the axis of the upper section of rotating shaft 12b, due to the current generated in the ambient liquid by the whirlpool created by the basket rotation and any uneven filling of the basket with coffee, the lower shaft section of rotating shaft 12b, and concomitantly basket 25, will be rotated at random angles relative to the axis of the upper shaft section during the course of the aforesaid basket rotation. The brewing cycle is thus accelerated, and the time required for the essence extraction reduced.

Figure 12:
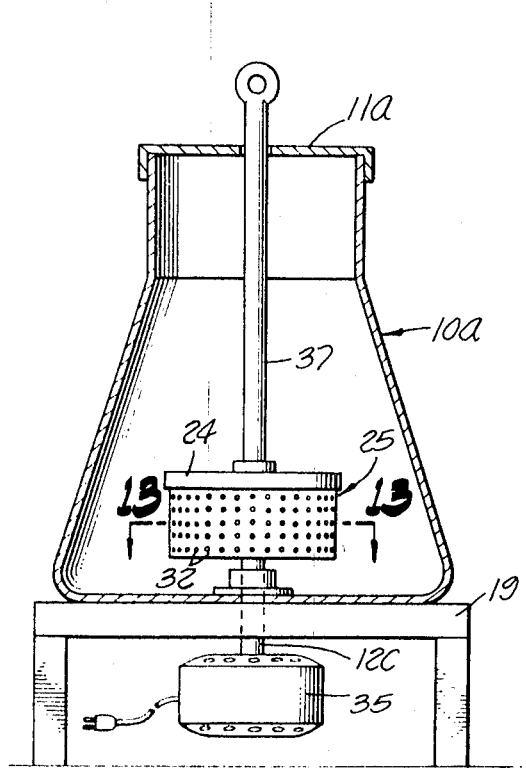
FIG. 12 illustrates still another embodiment of the invention wherein the rotating means for the basket is inserted through the bottom of the container and the basket is inserted and removed through the top thereof.
Figure 13:
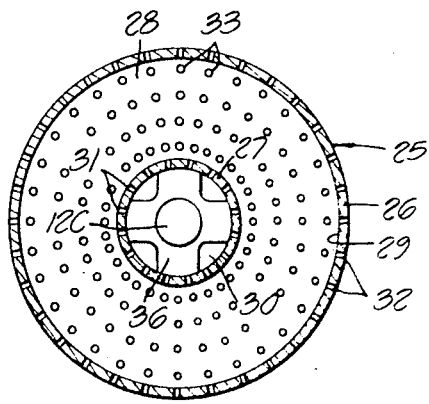
FIG. 13 is a top plan view, in section, of the basket illustrated in FIG. 12, taken on the line 13—13 thereof.

FIGS. 12 and 13 illustrate still another alternate embodiment from that of FIGS. 7-10 wherein basket 25 is interconnected with a conventional rotating means 35 (herein shown as an electric motor) by rotating shaft 12c which extends through heating element 19 and the bottom of receptacle 10. Rotating shaft 12c is attached to bottom wall 28 of basket 25 by any conventional means such as radial arms 36 extending from shaft 12c and snapped into snug engagement with the base of inner wall 27 of the basket. To insert and remove basket 25 from within receptacle 10, removal rod 37 which passes through cap 11 is secured to basket cap 24 and concomitantly basket 25 as in the previous embodiments. In all other respects the elements illustrated in FIG. 12 are similar to those elements shown in FIGS. 7–9 and 11 and, accordingly, to facilitate the illustration thereof, have been provided with similar reference numerals.

Figure 14:
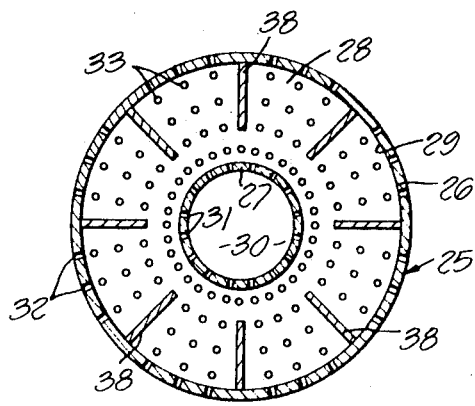
FIG. 14 is a top plan view of the basket of FIGS. n-10 except that the outer wall is provided with a plurality of longitudinal baffle plates extending radially inward therefrom.
Figure 15:
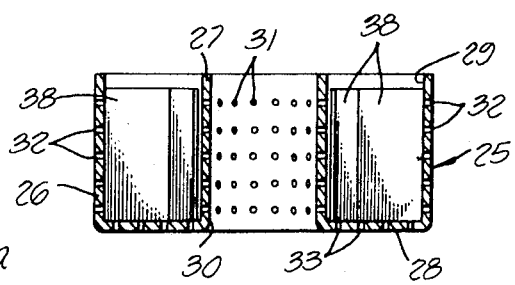
FIG. 15 is an elevational view, in section, of the basket embodiment illustrated in FIG. 14.

FIGS. 14 and 15 illustrate yet another alternate embodiment of the basket from the embodiments of FIGS. 7–13 wherein a plurality of longitudinal baffles 38 are radially attached to inner surface 29 of outer wall 26 of the basket 25. In all other respects the basket of FIGS. 14 and 15 is similar to the basket illustrated in FIGS. 7–11. Baffles 38 insure the maintenance of the contents of basket 25 in a uniform dispersion of the food substance about the inner surface 29 of outer wall 26 of basket 25.

Figure 16:
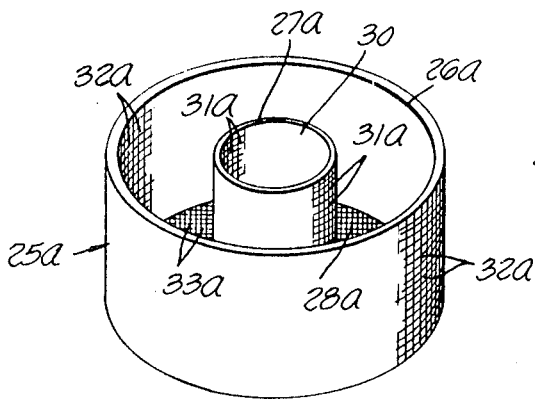

FIG. 16 illustrates still another alternate embodiment of the basket from the embodiments of FIGS. 7–11, except that outer wall 26a, inner wall 27a and bottom wall 28a of basket 25a are all comprised of wire mesh. The mesh openings 32a, 31a and 33a of the respective walls provide the same functions as do wall openings 32, 31 and 33 of the basket of the embodiments hereinabove mentioned. The embodiment of the basket 25a illustrated in FIG. 16 is utilized and operated in every respect similarly to the basket illustrated in FIGS. 7–11. It should be noted that basket 25a illustrated in FIG. 16 may also be provided with longitudinal radially extending baffles (such as 38 in FIGS. 14 and 15). It may also be rotated from the bottom as is the basket shown in FIGS. 12 and 13.

While several embodiments of the invention and the method of using the same have been described, it is understood that the particular embodiments of the invention herein disclosed are for illustrative purposes only and that various changes may be made therein without departing from the principles of the invention.

I CLAIM

1. An apparatus for extracting the essence from a food substance, comprising:
    a receptacle body having a bottom and side walls secured thereto;
    rotatable shaft means extending into said receptacle body coextensively with the vertical axis of said body;
    enclosed porous receptacle means positioned within said body receptacle secured to said shaft means in spatial relationship with the sides and bottom of said receptacle body, said porous receptacle means being secured to the rotatable shaft means so that the receptacle means are in spatial displacement from the shaft when the shaft is rotated, and
    means attached to said shaft means for rotating the same.

2. An apparatus for extracting the essence from a food substance as described in claim 1, wherein the porous receptacle means is an enclosed porous basket.

3. An apparatus for extracting the essence from a food substance as described in claim 2, wherein the enclosed porous basket is suspended from outwardly extending support members secured to the rotatable shaft means.

4. An apparatus for extracting the essence from a food substance as described in claim 3, wherein the basket is perforated.

5. An apparatus for extracting the essence from a food substance as described in claim 3, wherein the basket is meshed.

6. An apparatus for extracting the essence from a food substance as described in claim 2, wherein the rotatable basket means is oscillated in a plane substantially parallel to the axis of the rotating shaft means.

7. An apparatus for extracting the essence from a food substance as described in claim 1, wherein the porous receptacle means is an enclosed porous bag.

8. An apparatus for extracting the essence from a food substance as described in claim 7, wherein the enclosed porous bag is suspended from outwardly extending support members secured to the rotatable shaft means.

9. An apparatus for extracting the essence from a food substance as described in claim 1, wherein the rotatable shaft means for rotating the basket includes a universal joint so that a portion of said rotating shaft means rotates about its axis and the other portion thereof is attached to the basket so that said basket is agitated in a variety of planes as well as being rotated about the axis of said rotating shaft means.

* * * * *